United States Patent
Bertram

(10) Patent No.: US 7,668,988 B2
(45) Date of Patent: Feb. 23, 2010

(54) DATA BUS INVERSION DETECTION MECHANISM

(75) Inventor: Raymond A. Bertram, Austin, TX (US)

(73) Assignee: Via Technologies, Inc., Taipei (TW)

( * ) Notice: Subject to any disclaimer, the term of this patent is extended or adjusted under 35 U.S.C. 154(b) by 245 days.

(21) Appl. No.: 11/857,503

(22) Filed: Sep. 19, 2007

(65) Prior Publication Data

US 2009/0077286 A1 Mar. 19, 2009

(51) Int. Cl.
*G06F 13/38* (2006.01)
*G06F 13/00* (2006.01)

(52) U.S. Cl. .......................... 710/65; 710/100

(58) Field of Classification Search .......... 710/65, 710/100

See application file for complete search history.

(56) References Cited

U.S. PATENT DOCUMENTS

| | | | |
|---|---|---|---|
| 6,584,526 B1 | 6/2003 | Bogin et al. | |
| 6,898,648 B2 | 5/2005 | LaBerge | |
| 7,139,852 B2 | 11/2006 | LaBerge | |
| 7,501,963 B1 * | 3/2009 | Hollis | 341/55 |
| 7,522,073 B1 * | 4/2009 | Kao | 341/55 |
| 2001/0027504 A1 * | 10/2001 | Devanney et al. | 710/129 |
| 2002/0156953 A1 | 10/2002 | Beiley et al. | |
| 2004/0068594 A1 | 4/2004 | Asaro et al. | |
| 2005/0216630 A1 | 9/2005 | Gaskins et al. | |
| 2006/0248326 A1 | 11/2006 | Joshi | |
| 2007/0011379 A1 * | 1/2007 | Pawlowski | 710/110 |
| 2007/0038789 A1 | 2/2007 | Macri et al. | |
| 2007/0115733 A1 | 5/2007 | Jang et al. | |

FOREIGN PATENT DOCUMENTS

EP  0444774 A2  9/1991

* cited by examiner

*Primary Examiner*—Alford W Kindred
*Assistant Examiner*—David E Martinez
(74) *Attorney, Agent, or Firm*—Richard K. Huffman; James W. Huffman

(57) ABSTRACT

A bus inversion apparatus includes exclusive-OR gates and an inversion detector. The exclusive-OR gates are coupled to an instant data bus and a last data bus. The data buses have a corresponding plurality of bits, where the exclusive-OR gates perform a bitwise comparison of the data buses, and provide an exclusive-OR bus. The states of the exclusive-OR bus indicate whether corresponding bits of the data buses are different. The inversion detector counts the number of the corresponding bits that are different, and indicates that the instant data bus should be inverted. The inversion detector has a plurality of left shift circuits, each configured to perform a logical left shift of input bits as directed by the states of shift bits, where outputs of the each of the plurality of left shift circuits indicate a number of a subgroup of the corresponding bits that are different.

19 Claims, 5 Drawing Sheets

CONVENTIONAL BUS STATE SENSE MECHANISM

DATA BUS INVERSION DETECTION MECHANISM

BACKGROUND OF THE INVENTION

1. Field of the Invention

This invention relates in general to the field of microelectronics, and more particularly to an apparatus and method for performing data bus inversion within a present day microprocessor.

2. Description of the Related Art

Many present day computer-based systems rely heavily on high-speed parallel buses to transfer address, data, control, and input/output information. The well-known source synchronous quad-pumped data bus that is employed in x86-compatible microprocessors is just one example of a 64-bit data bus that is divided into four data signal subgroups, each consisting of 16 bits. Each of the 16-bit data signal subgroups is routed over a separate path, typically via motherboard traces, and additionally includes source strobe signals and bus inversion signals that are unique to that data signal subgroup. The source strobe signals are strobed by a sending element on the bus to indicate validity of the data, or information, on the data signal subgroup. And the bus inversion signals are asserted to indicate that the information itself is being transmitted in complementary form. That is, when a sending element provides the inverted states of the data that is being transmitted over the data signal subgroup, the bus inversion signals for that data signal subgroup are asserted to indicate that inverted data is being transmitted rather than true data. When the states of a particular data signal subgroup are complemented for transmission over the data bus, this is known as a data bus inversion technique.

Data bus inversion is becoming increasingly prevalent in present day bused system designs as a result of increased emphasis on reducing the power required for bus transactions and a continuing need to minimize bus noise. Accordingly, as one skilled in the art will appreciate, both power and noise are minimized when the number of bits that change state on the bus, or signal group, are minimized.

Consequently, designers have provided elements within many present day integrated circuits that compare the current states of a given group of bus signals with the states which are to be transmitted during a following bus cycle. And if the number of signals that will change state during the next bus cycle is greater than, say, half of the total number of signals in the given group, then, rather than transmitting the true states of the given group during the next bus cycle, the bitwise complement of the true states are transmitted, and a corresponding data bus inversion signal is asserted to indicate that the inverted states of the data are being transmitted rather than the true states. Thus, a lesser number of state transitions occur over the bus from cycle to cycle, resulting in a savings in power and markedly reduced bus noise.

Determining which bits of a given signal group will change is relatively straightforward. The current, or last, data states are bitwise compared with the states to be transmitted via performing a bitwise exclusive-OR operation. The result is a number of exclusive-OR result bits that are asserted for those bits on the bus that will change during the next bus cycle. While determining which of the bits that will change is simple from a circuit design perspective, the operation of counting the number of bits that will change is not so simple.

In most systems, a series of full adders are employed to count the bits which will change, that is, the number of asserted bits on the exclusive-OR result bus. At a first stage, a number of 1-bit adders are employed to add the number of asserted bits in a subgroup of bits of the exclusive-OR result bus. As one skilled in the art will appreciate, 1-bit adders accept three inputs: a first input, a second input, and a carry input. And a 1-bit output along with a carry out bit are generated. Thus, the 1-bit adder generates the sum of its three inputs and generates a 2-bit binary output.

The 2-bit outputs from two adjacent 1-bit adders are next provided as inputs, along with an additional bit from the exclusive-OR result bus, to a 2-bit adder, which generates a 3-bit sum on its output. The 3-bit outputs from two adjacent 2-bit adders are then routed as inputs to a 3-bit adder along with another uncounted bit from the exclusive-OR result bus, which in turn generates a 4-bit sum on its output. The stages of full addition continue with increasing size of the adders in a subsequent stage, until all, or a majority of the bits on the exclusive-OR result bus have been counted for changed state. The output of a final adder stage indicates the number of bits that will change during the next cycle, of those bits which have been counted.

As one skilled in the art will appreciate, the implementation of a full adder requires that an exclusive-OR of the adder's inputs be performed. And to perform an exclusive-OR operation requires that all of the inputs be inverted to provide complementary states for performing the exclusive-OR operation.

The present inventor has observed that the generation of complementary states for the inputs to a full-adder does not create a problem when static logic design techniques are employed. However, more and more integrated circuit designs, and particularly those associated with high-speed bused systems, are utilizing dynamic logic design techniques, where many circuits therein utilize so-called domino logic.

Dynamic logic designs are different from static logic because they utilize a gated clock to evaluate combinational logic circuits. The clock is employed to synchronize transitions in sequential logic circuits, as in a pipeline microprocessor where the design is decomposed into many different pipeline stages, and the clock is used to synchronize the transfer of data from one stage to the next, like stations in an assembly line.

In most dynamic logic circuits, their output is driven high or low during a given half-cycle of the clock, and the circuits are allowed to transition to the opposite state as a function of the inputs, during the other half of the clock cycle. Thus, the clock signal becomes an integral and gating mechanism in all dynamic circuits. It is not within the scope of the present application to provide a tutorial on dynamic logic design techniques, however, it is sufficient to note that following a dynamic stage that is gated by the clock, with one or more static stages, for purposes of evaluating additional input data, is known as "domino" logic. This is because when the clock transitions to allow the inputs of the dynamic stage to evaluate, the states of the subsequent static stages transition like a row of dominoes.

Consequently, any additional gate delays that are required to evaluate a given set of inputs adds latency to the time required to evaluate a given set of inputs. And the present inventor has noted that when domino logic elements are employed, the additional gate delays that are required to generate the complements of the input states for any of the full adders in a data bus inversion mechanism as described above, are unacceptable. The present inventor has thus sensed a need in the art to provide a data bus inversion mechanism that can more easily be implemented using domino logic design techniques than that which is presently provided.

The present inventor has also observed that the use of 1-bit adders as a first stage to count bits in an exclusive-OR result bus accounts for bits on the bus in groups of three: a first input, a second input, and a carry input. So, for a 16-bit signal group, a designer is either forced to implement an additional 1 bit adder to account for the last bit in the group of 16, or to simply ignore one of the bits during the evaluation for data bus inversion. It is more likely than not that the last bit is simply ignored, and thus, the power and noise attributes on the bus are sacrificed.

Accordingly, the present inventor has also noted a desire in the art to evaluate all of the bits within a signal group for state transition in order to minimize the power consumed and noise produced from one cycle to the next over a high-speed bus.

Therefore, it is an object of the present invention to provide a bus state sense mechanism that tests all of the bits within a given signal group for state changes. In addition, it is an object of the present invention to provide a data bus inversion technique that reduces the latency incurred to determine whether or not a data bus inversion is to be performed, and particularly when using domino logic elements.

SUMMARY OF THE INVENTION

The present invention, among other applications, is directed to solving the above-noted problems and addresses other problems, disadvantages, and limitations of the prior art. The present invention provides a superior technique for performing data bus inversion in a microprocessor or other integrated circuit that is coupled to a bus. In one embodiment, a bus inversion apparatus is provided. The bus inversion apparatus includes a plurality of exclusive-OR gates and an inversion detector. The plurality of exclusive-OR gates are coupled to an instant data bus and a last data bus. The data buses have a corresponding plurality of bits, where the plurality of exclusive-OR gates are configured to perform a bitwise comparison of the data buses, and to provide an exclusive-OR bus. The states of bits in the exclusive-OR bus indicate whether corresponding bits of the data buses are different. The inversion detector is coupled to the exclusive-OR bus. The inversion detector is configured to count the number of the corresponding bits that are different, and is configured to indicate that the instant data bus should be inverted. The inversion detector has a plurality of left shift circuits, each configured to perform a logical left shift of input bits as directed by the states of shift bits, where outputs of the each of the plurality of left shift circuits indicate a number of a subgroup of the corresponding bits that are different.

One aspect of the present invention contemplates a bus inversion mechanism. The bus inversion mechanism has a plurality of exclusive-OR gates and an inversion detector. The plurality of exclusive-OR gates is coupled to an instant data bus and a last data bus. The data buses have a corresponding plurality of bits, where the plurality of exclusive-OR gates are configured to perform a bitwise comparison of the data buses, and to provide an exclusive-OR bus. The states of bits in the exclusive-OR bus indicate whether corresponding bits of the data buses are different. The inversion detector is coupled to the exclusive-OR bus. The inversion detector counts the number of the corresponding bits that are different, and indicates that the instant data bus should be inverted. The inversion detector includes a plurality of relative count circuits, each configured to perform logical operations on the true states of input bits, the true states being exclusively operated upon, where outputs of the each of the plurality of relative count circuits indicate a range of a subgroup of the corresponding bits that are different. The plurality of relative count circuits includes and one or more relative count 2 circuits, one or more relative count 4 circuits, and one or more relative count 8 circuits.

Another aspect of the present invention comprehends a method for performing bus inversion. The method includes first performing a bitwise exclusive-OR of an instant data bus and a last data bus, the data buses having a plurality of bits, and providing an exclusive-OR bus, where the states of bits in the exclusive-OR bus indicate whether corresponding bits the data buses are different; and counting the number of the corresponding bits that are different, and indicating that the instant data bus should be inverted. The counting includes second performing logical operations on the true states of the bits in the exclusive-OR bus, where the true states are exclusively operated upon, and indicating a range of a subgroup of the corresponding bits that are different; and first generating one or more relative counts of two of the corresponding bits, second generating one or more relative counts of four of the corresponding bits, and third generating one or more relative counts of eight of the corresponding bits, and fourth generating one or more relative counts of all of the corresponding bits.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
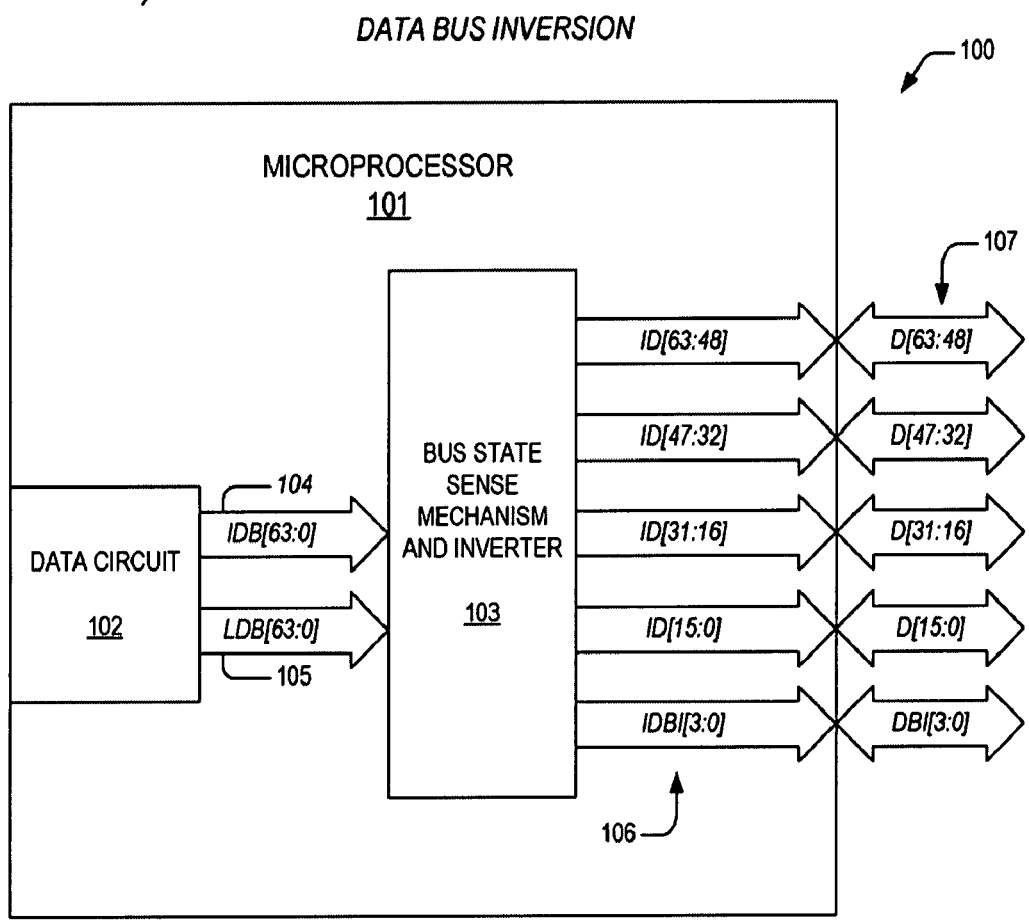
FIG. 1 is a block diagram illustrating a conventional mechanism for performing data bus inversion in a present day microprocessor.
Figure 2:
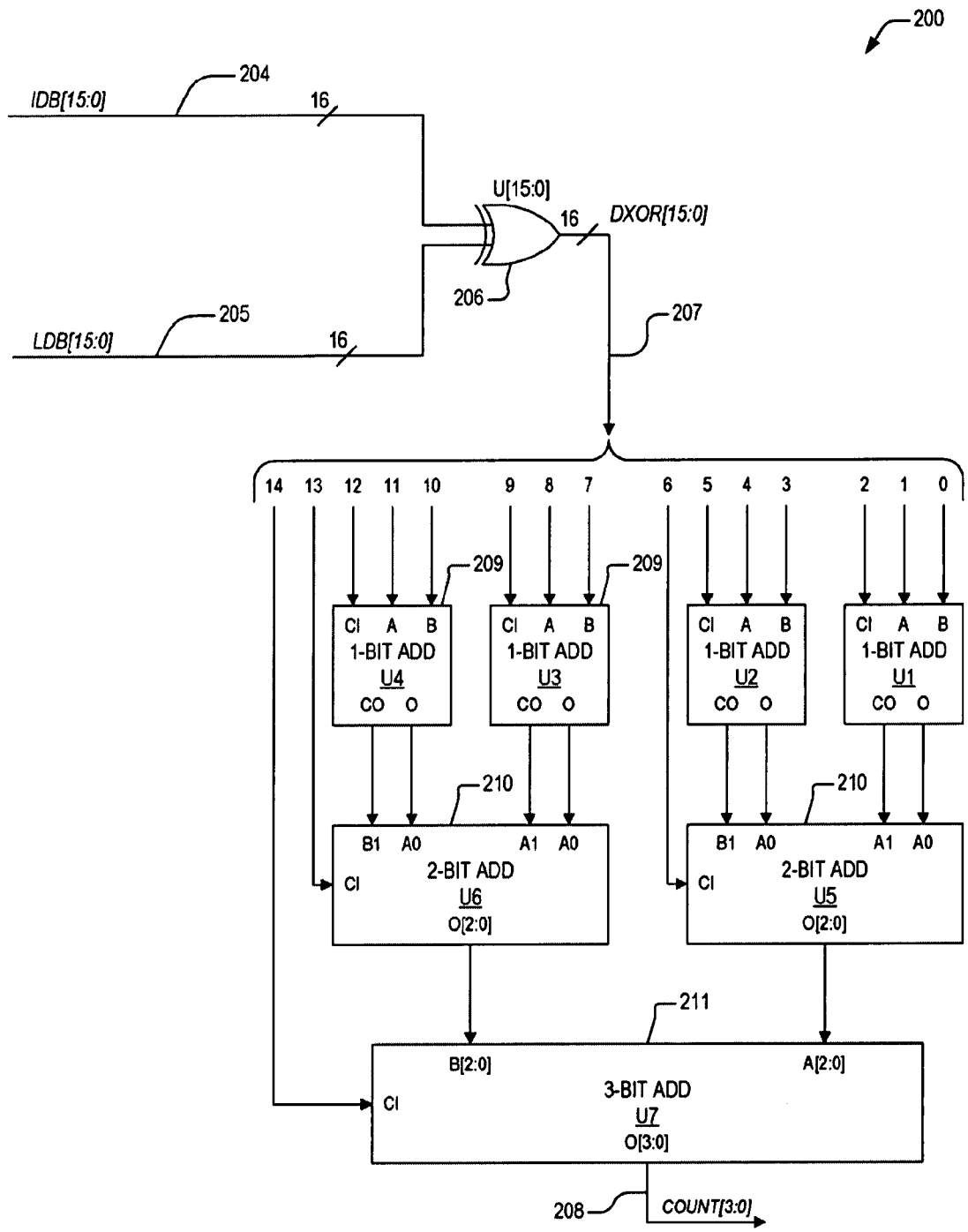
FIG. 2 is a block diagram depicting details of a present day bus state sense mechanism, such as may be included in the bus state sense mechanism and inverter in the microprocessor of FIG. 1.

In view of the above background discussion on bus inversion principles and associated techniques employed within present day microprocessors for detecting the number of bits on a bus which are to be changed during a subsequent bus cycle, a discussion of the limitations of these techniques will now be presented with reference to FIGS. 1-2. Following this discussion, the present invention will be discussed with reference to FIGS. 3-5. The present invention provides a superior technique for sensing the number of bits on a bus which are to be changed, and the associated apparatus and method are particularly useful in integrated circuits that rely on the use of domino logic elements.

Referring to FIG. 1, a block diagram 100 is presented illustrating a conventional mechanism for performing data bus inversion in a present day microprocessor 101. The microprocessor 101 has a data circuit 102 that is coupled to a bus state sense mechanism and inverter 103 via an instant data bus 104, having instant signals IDB[63:0] disposed thereon, and a last data bus 105 having last data signals LDB[63:0] disposed thereon. The sense mechanism and inverter 103 is coupled to an internal data bus 106 having internal data signals IDB[63:0] disposed thereon along with internal data bus invert signals IDBI[3:0]. The internal data bus 106 is coupled to an external data bus 107 at interface points (not shown) of the microprocessor 101, as are commonly known in the art, which include metallic pads, wire bonds, etc. The external data bus 107 has similarly named signals D[63:0], DBI[3:0] disposed thereon, absent a leading "I" in each of the signal names. The external data bus 107 is employed to couple the microprocessor 101 to other devices (not shown) for the purpose of transferring data.

One skilled in the art will appreciate that the states of all of the buses 104, 105, 106, 107 are established in synchronization with a reference clock signal (not shown), commonly referred to as a bus clock. In addition, one skilled in the art will understand that a present day microprocessor 101 may include an internal core clock (not shown) having a frequency that is an integer multiple of the reference clock to allow for operation of the microprocessor core circuits at a rate much faster than that provided for by the reference clock. For clarity purposes, the reference clock and core clock are not shown.

Furthermore, one skilled in the art will appreciate that a present day microprocessor 101 includes hundreds of additional circuits over those depicted in the block diagram 100. However, for clarity, only those features of a present day microprocessor 101 that are required for data bus inversion are presented in the block diagram 100. For example, it is common practice to provide buffered bus drivers (not shown) at the interface points between the internal data bus 106 and external data bus 107 to provide for efficient transfer of data in accordance with the particular bus protocol that is employed. For clarity, these driver circuits are not depicted in the block diagram 100.

As noted above, data bus inversion is a technique that is employed in present day bused data systems to minimize power consumption and electrical noise caused by high-speed switching of the external data bus 107. Accordingly, the data circuit 102 provides on the instant data bus 104 the states of data bits to be transmitted over the external data bus 107 during a next bus cycle. The data circuit 102 also provides on the last data bus 105 the states of data bits which are presently being transmitted over the external data bus 107 during a current bus cycle. The bus state sense mechanism and inverter 103 compares, on a bit-by-bit basis, the states of the bits which are currently being transmitted LDB[63:0] with the states of the bits which are about to be transmitted IDB[63:0], and counts the number of bits which have changed. In many configurations, if approximately more than half the number of bits have changed states (i.e., logical one state to logical zero state, and vice versa), then the resultant overall change of state for signals D[63:0] on the external data bus 107 would require more power and would emit more noise during the next bus cycle than if the complement of the new state (i.e., the inverted state of signals IDB[63:0] on the instant data bus 104) were to be put out on the external data bus 107. Accordingly, if more than approximately half of the number of bits will change state during the following bus cycle, then the bus state sense mechanism and inverter 103 provides the complementary states (i.e., the inverted states) of signals IDB[63:0] on the internal data bus 106 and also indicates via the states of internal data bus invert signals IDBI[3:0] that the complementary states are being provided. During the next bus cycle, the complementary states of signals ID[63:0] are transmitted over the external data bus 107, according to the particular bus protocol that is employed, along with the states of internal data bus invert signals IDBI[3:0] to indicate that the inverted states are being transmitted.

The foregoing discussion presumes that all of the external data bus signals [D63:0], DBI[3:0] are routed over the external data bus 107 along the same path, thus exhibiting substantially the same transmission line characteristics. However, in most present day systems, this is not the case, particularly in those so-called source synchronous bus configurations, as is exemplified by the ubiquitous source synchronous (also known as "quad-pumped") bus that is associated with an x86-compatible microprocessor. Accordingly, for configurations where signal groups D[63:48], D[47:32], D[31:16], D[15:0] are routed over the external data bus 107 along different signal paths, it is desired to perform data bus inversion for each of the signal groups D[63:48], D[47:32], D[31:16], D[15:0] individually in order to minimize power and noise over the individual signal paths. Such a configuration is illustrated in the block diagram 100, where it is assumed that the external data bus 107 is routed over four signal paths corresponding signal groups D[63:48], D[47:32], D[31:16], D[15:0]. Consequently, four data bus invert signals DBI[3:0] are provided, to indicate inversion of a corresponding signal group D[63:48], D[47:32], D[31:16], D[15:0]. For example, a DBI[3:0] value of 0101b may indicate transmission of the inverted states of signal groups D[47:32] and D[15:0], while signal groups D[63:48] and D[31:16] are transmitted in their true, or non-inverted states.

Thus, the bus state sense mechanism and inverter 103 compares the states of the bits of signals IDB[63:48] with the states of signals LDB[63:48], on a bitwise basis, and if approximately more than half of the states are changed, then the inverted states of IDB[63:48] are provided over the internal data bus 106 on signals ID[63:48] and signal LDB[3] is asserted to indicate the inversion. Likewise, the states of the bits of signals IDB[47:32], IDB[31:16], and IDB[15:0] are compared with the states of signals LDB[47:32], LDB[31:16], and LDB[15:0], respectively and, if inversion is to be performed, then the inverted states are accordingly provided over the internal data bus 106 on signals ID[47:32], ID[31:16], and ID[15:0], and signals IDB[2:0] are asserted accordingly to indicate inversion.

Although the external data bus 107 of FIG. 1 is depicted as a 64-bit external data bus 107 divided into four 16-bit signal groups D[63:48], D[47:32], D[31:16], D[15:0], it is noted that such a configuration is presented only to teach limitations of the current state-of-the-art. One skilled in the art will appreciate that data bus inversion techniques as described above are applicable to virtually any type of bus configuration, to include address buses, control buses, and the like, and it also applicable to buses of different widths (e.g., a 256-bit bus). In addition, it is noted that a particular signal grouping that is designated for inversion is determined based upon a common signal path over the external bus 107. Consequently, various signal groups can consist of differing numbers of signals and, thus, the bus state sense mechanism and inverter 103, for these applications, must provide for counting and indicating inversion of differing numbers of changed bits accordingly.

The present inventor has noted that while inverting that states of one or more signal groups IDB[63:48], IDB[47:32], IDB[31:16], IDB[15:0] is simple and fast, the operations that are required to determine whether or not inversion is required for a particular signal group IDB[63:48], IDB[47:32], IDB[31:16], IDB[15:0] is not straightforward. The present inventor has also observed that counting the number of changed bits in a particular signal group IDB[63:48], IDB[47:32], IDB[31:16], IDB[15:0] is a logic-intensive and time-consuming operation. And the time required to count changed bits in a signal group IDB[63:48], IDB[47:32], IDB[31:16], IDB[15:0] must be added to the amount of time it takes to complete an overall data transfer. This increase in latency, while perhaps small in absolute terms, is significant in relative terms, and can account for a substantial percentage of the time required to transfer data to an external data bus 107, particularly when dealing with a present day high-speed data bus 107 that is capable of transferring data in nanoseconds. For instance, an increase of ten to twenty percent in bus latency can reduce bus bandwidth by a comparable amount, resulting in a significant loss of system performance. These disadvantages will now be discussed in more detail with reference to FIG. 2.

FIG. 2 is a block diagram depicting details of a present day bus state sense mechanism 200, such as may be included in the bus state sense mechanism and inverter 103 in the microprocessor 101 of FIG. 1. The sense mechanism 200 is configured to compare and count the number of bits that are to be changed during a following bus cycle. Another aspect of the bus state sense mechanism and inverter 103 of FIG. 1 is logic units (not shown), or elements, which are required to invert the states of designated signal groups. Inversion of a group of bits is a well-known operation and, hence, those elements required for inversion, for clarity sake, are not depicted.

The sense mechanism 200 of FIG. 2 is configured to compare and count state changes for a 16-bit signal group, such as signal group D[15:0] shown in FIG. 1. It is understood that four such sense mechanisms 200 would be employed in the configuration of FIG. 1 in order to compare and count bit state changes for each of the four signal groups D[63:48], D[47:32], D[31:16], D[15:0] on the external data bus 107. For teaching purposes, signal group D[15:0] is chosen for this example, and thus, signal group IDB[15:0] on an instant data bus 204 is compared with signal group LDB[15:0] on a last data bus 205. The instant and last data buses 204, 205 are coupled to exclusive-OR (XOR) gates 206 on a bitwise basis, the gates being designated U15 through U0, where each XOR gate 206 compares a respective instant data bit IDB[X] with a corresponding last data bit LDB[X] and generates a corresponding output DXOR[X] over signals DXOR[15:0] on exclusive-OR bus 207. For example, signals IDB[0] and LDB[0] are coupled to XOR gate U0, and the output of the U0 gate 206 is provided on signal DXOR[0]. If the two signals IDB[0], LDB[0] are the same state, then output DXOR[0] is a logical zero. If the two signals IDB[0], LDB[0] are different states, then output DXOR[0] is a logical one. In like manner, the remaining bits on the instant data bus 204 are compared to corresponding bits on the last data bus 205 via XOR gates U15 through U1, and outputs DXOR[15:1] are produced on bus 207 to indicate results of the respective XOR operations.

Hence, for a 16-bit signal group, such as is shown in FIG. 2, it is desired to count the bits on the XOR bus 207 which are set to a logical one. And if more than eight bits on bus 207 are set to a logical one state, then it is desirable to invert the corresponding data bits ID[15:0] on the internal data bus 106 and to indicate their inverted state by asserting IDBI[0].

In practice, designers typically employ four 1-bit full adders 209 as a first stage to add up the number of changed bits for 12 of the 16 bits of DXOR[15:0]. Hence, each 1-bit full adder 209 accepts three of the 12 bits of DXOR[15:0] and produces a sum output O and a carry output CO. In the configuration shown in FIG. 2, DXOR[0] is coupled to input B of adder U1, DXOR[1] is coupled to input A of U1, and DXOR[2] is coupled to a carry input C1 of U1. In similar fashion, signals DXOR[5:3] are coupled to U2, signals DXOR[9:7] are coupled to U3, and signals DXOR[11:8] are coupled to U4.

In operation, each of the 1-bit adders 209 provides a binary value on outputs CO and O that indicate the number of input bits that are equal to a logical one, thus indicating the number of changed bits in their respective inputs.

The results (i.e., outputs O and carry bits CO) from the four first-stage adders 209 are provided as inputs to a second stage of 2-bit full adders 210, and two more additional bits DXOR[13], DXOR[6] from the XOR bus 207 are provided as carry inputs C1 to the two 2-bit adders 210. In operation, each of the 2-bit adders 210 provides a 3-bit binary value on outputs O[2:0] that is the sum of their respective inputs A[1:0], B[1:0], C1, which indicates the number of changed bits in their respective 7-bit group. Thus, output O[2:0] of adder U5 indicates the number of bits that have changed in DXOR[6:0] and output O[2:0] of U6 indicates the number of bits that have changed on DXOR[13:7].

The result outputs O[2:0] from the two 2-bit adders 210 are provided as inputs A[2:0], B[2:0] to a 3-bit adder 211 in the third (and final) stage along with one more bit DXOR[14] from the XOR bus 207, which is coupled to a carry input of the 3-bit adder 211. Accordingly, the 3-bit adder sums the number of bits in group DXOR[14:0] which have changed, and provides a binary value indicating the changed bits number on a changed number bus 208, having signals COUNT[3:0] disposed thereon.

The present inventor notes that only 15 of the 16 bits of DXOR[15:0] are counted according to the technique of FIG. 2. To count an additional bit would require significantly more logic circuits than those shown and, consequently, most bus state sense mechanisms 200 that are employed in conventional systems simply ignore one of the bits in a 16-bit XOR bus 207, and provide a count of changed bits for 15 out: of the 16 bits. The count is provided on the changed number bus 208 and inversion logic (not shown) typically determines that the corresponding 16-bit signal group D[15:0] is to be inverted when, say, the value of the count signals COUNT[3:0] is greater than 0111b.

The conventional bust state sense mechanism 200 of FIG. 2 is fairly effective from both a timing and power perspective when employed in a microprocessor 101 or other integrated circuit that is designed using conventional logic design elements and/or circuits. But as was alluded to above, with increasingly prevalent use of dynamic logic design techniques in more advanced microprocessors and related circuits, domino circuits are being used to increase the speed at which logic evaluations are accomplished. And the present inventor has noted that prior art techniques for counting changed bits for purposes of data bus inversion, such as have been discussed with reference to FIGS. 1-2, are very inefficient from the standpoint of the number of logic gates required to implement the adder elements 209-211. This is because, as one skilled in the art will appreciate, exclusive-OR sub-elements are required to implement any type of adder 209-211, and the implementation of exclusive-OR elements using domino circuits is inefficient because an XOR operation requires both the true and complementary states of each input in order to evaluate the XOR function. And each inversion of a true state to produce its complementary state introduces a level of gate delay, thus adding significant latency to the overall changed bit counting operation. In addition, because power consumption and bus noise minimization are becoming increasingly important from a system perspective, the present inventor has sensed a need to provide a mechanism for evaluating all of the changed bits in a given signal group, as opposed to counting less than all of the bits, as is typically done in present day bus state sense logic 200.

As one skilled in the art will additionally appreciate, domino circuits that perform simple, stacked logic operations such as logic AND operations and logic OR operations, and especially wide logical OR operations, are relatively simple and efficient to construct. However, one skilled will appreciate that more complex Boolean combinations such as XOR require significantly more logic to construct. In the specific case of an XOR function, one skilled will appreciate that both the true and complement of each input must be evaluated, as noted above. Such a circuit is simple to design and fabricate when using conventional circuit design methods, but is significantly more complex to design and implement using domino logic design techniques.

Consequently, the present inventor has observed that it is very desirable to minimize the number of XOR operations that are required to perform a changed bits bus state sense function, as is described above for purposes of declaring a data bus inversion event for a given signal group on an external data bus.

It is also noted, as one skilled will appreciate, that it is necessary to perform an initial XOR operation of an instant data signal group with a last data signal group, as is shown in FIG. 2 via XOR gates U15-U0, to determine which specific bits have changed, but that it is very advantageous to eliminate, if possible, the full adders 209-211 altogether, for it is well known that XOR logic is required in any device that implements an add function and, as is noted above, XOR functions required substantially more circuits to implement in dynamic logic because of the requirement to evaluate both true and complementary states of each of the inputs to an adder 209-211.

The present invention overcomes the above-noted limitations of present day changed bit counting mechanisms by providing an apparatus and method that enable all of the bits in a signal group to be counted for changes, and that can be implemented efficiently using domino logic design techniques. In one embodiment, the present invention reduces the number of XOR functions that are required by employing a combination of simple logic and logical shift functions to count changed bits. In another embodiment, the present invention provides for counting of changed bits using only logical AND and logical OR sub-elements, in a manner that requires only the true states of a changed bit data bus. The present invention will now be discussed with reference to FIGS. 3-5.

Figure 3:
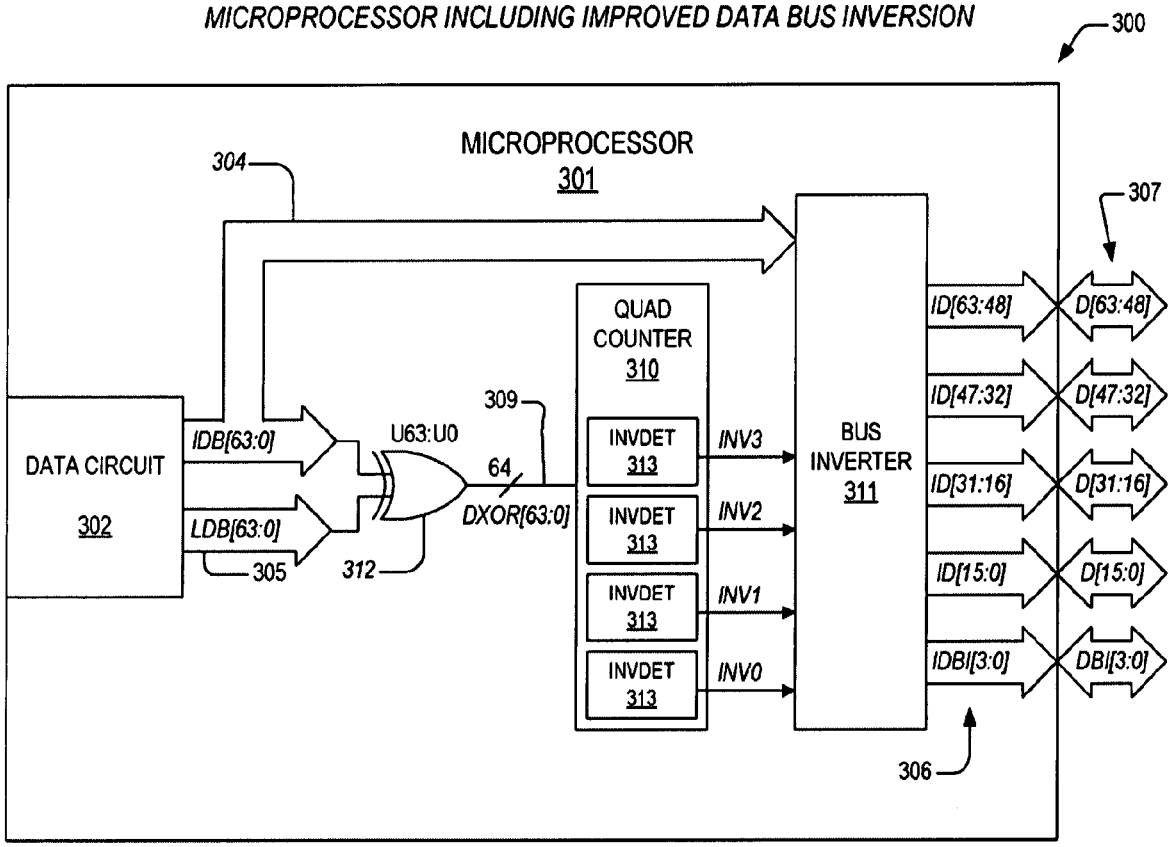
FIG. 3 is a block diagram featuring a microprocessor according to the present invention that includes an improved data bus inversion detection mechanism which can easily be implemented in domino logic circuits.

Referring to FIG. 3, a block diagram 300 is presented featuring a microprocessor 301 according to the present invention that includes an improved data bus inversion detection mechanism 310 which can easily be implemented in domino logic circuits. Like the microprocessor 101 of FIG. 1, the microprocessor 301 according to the present invention has a data circuit 302 that provides an instant data bus 304, having instant signals IDB[63:0] disposed thereon, and a last data bus 305 having last data signals LDB[63:0] disposed thereon. The instant and last data buses 304-305 are coupled bitwise to a plurality of exclusive-OR gates 312, designated U63:U0. In one embodiment, the instant data bus 304 and the last data bus 305 each comprise 64-bits, although other bus widths are contemplated. In the embodiment shown in FIG. 3, like the example of FIGS. 1 and 2, counting of changed bits is performed for four 16-bit signal groups, corresponding to four 16-bit signal groups on an external data bus 307, comprising signal groups D[63:48], D[47:32], D[31:16], and D[15:0], along with corresponding data bus invert signals DBI[3], DBI[2], DBI[1], and DBI[0].

It is noted that the present invention contemplates signal groups having different numbers of bits, such as 32-bit groups, 8-bit groups, etc., along with signal groups having different widths, such as four 8-bit signal groups and two 16-bit signal groups. For clarity, however, the microprocessor 301 according to the present invention is depicted as being coupled to a 64-bit external data bus 307 having four 16-bit signal groups D[63:48], D[47:32], D[31:16], and D[15:0].

Thus, the XOR gates U63:U0 generate 64 outputs DXOR [63:0] over a changed bit bus 309, which is coupled to a quad changed bit counter 310 according to the present invention. The quad counter 310 includes four inversion detectors 313, each of which generate an invert group output INV3-INV0 that corresponds to the changed bits which are counted for an associated 16-bit signal group. For example, output INV0 corresponds to those changed bits which are counted for DXOR[15:0], INV1 corresponds to those changed bits which are counted for DXOR[31:16], and so on.

The invert group outputs INV3-INV0 are coupled to a bus inverter 311. The instant data bus 304 is also coupled to the bus inverter 311. The bus inverter 311 generates either a true signal group state or an inverted signal group state for each of four internal data bus signal groups ID[63:48], ID[47:32], ID[31:16], and ID[15:0], along with respective states of internal data bus invert signals IDBI[3:0] over an internal data bus 306, each of which are coupled to corresponding signal groups D[63:48], D[47:32], D[31:1.6], and D[15:0] and external data bus invert signals DBI[3:0] on the external data bus 307. The internal data bus 306 is coupled to the external data bus 307 at interface points (not shown) of the microprocessor 301, as are commonly known in the art, including metallic pads, wire bonds, etc. The external data bus 307 is employed to couple the microprocessor 301 to other devices (not shown) for the purpose of transferring data.

The configuration of FIG. 3 contemplates other types of buses other than data buses including, but not limited to, address buses, I/O buses, and control buses.

Like the microprocessor configuration of FIG. 1, the configuration according to the present invention establishes the states of all of the buses 304, 305, 306, 307 in synchronization with a reference clock signal (not shown), commonly referred to as a bus clock. In addition, the microprocessor 301 according to the present invention may include an internal core clock (not shown) having a frequency that is a multiple of the reference clock to allow for operation of the microprocessor core circuits, such as those depicted in the block diagram, at a rate much faster than that provided for by the reference clock. For clarity purposes, the reference clock and core clock are not shown. The microprocessor 301 also includes numerous other circuits (not shown) that are not depicted for clarity purposes.

In operation, the data circuit 302 provides on the instant data bus 304 the states of data bits to be transmitted over the external data bus 307 during a next bus cycle. The data circuit 302 also provides on the last data bus 305 the states of data bits which are presently being transmitted over the external data bus 107 during a current bus cycle. The states of the two buses 304, 305 are evaluated by the XOR gates 312 on a bitwise basis, to determine if they are different and corresponding bits DXOR[63:0] of the changed bit bus 309 are asserted to indicate a change.

The changed bits DXOR[63:0] are coupled in four groups of 16-bits to a respective inversion detector 313 within the quad counter 310. In the embodiment shown, each of the inversion detectors 313 is configured to assert its respective invert output INV3-INV0 if more than half of its inputs DXOR[XX:YY] are asserted, thus indicating that more than half of the bits have changed. The inversion detectors 313 according to the present invention are configured to count all of the bits that are provided in a changed bit signal group, in contrast to present day counting mechanisms.

Accordingly, if more than half of the number of bits of a given signal group will change state during the following bus cycle, then the associated inversion detector 313 asserts its invert output INV3-INV0, and bus inverter 311 provides the complementary states (i.e., the inverted states) of signals ID [XX:YY] on the internal data bus 306 and also indicates via the states of internal data bus invert signals IDBI[3:0], that the complementary states are being provided. During the next bus cycle, the complementary states of signals ID[XX:YY] are transmitted over the external data bus 307, according to the particular bus protocol that is employed, along with the states of internal data bus invert signal IDBI[Z], which is provided to external data bus invert signal DBI[Z], to indicate that the inverted states are being transmitted. These operations associated with data bus inversion are performed in parallel by the quad counter 310 and the bus inverter 311 for each of the four 16-bit external data bus signal groups D[63:48], D[47:32], D[31:16], and D[15:0], and corresponding external data bus invert signals DBI[3:0].

Figure 4:
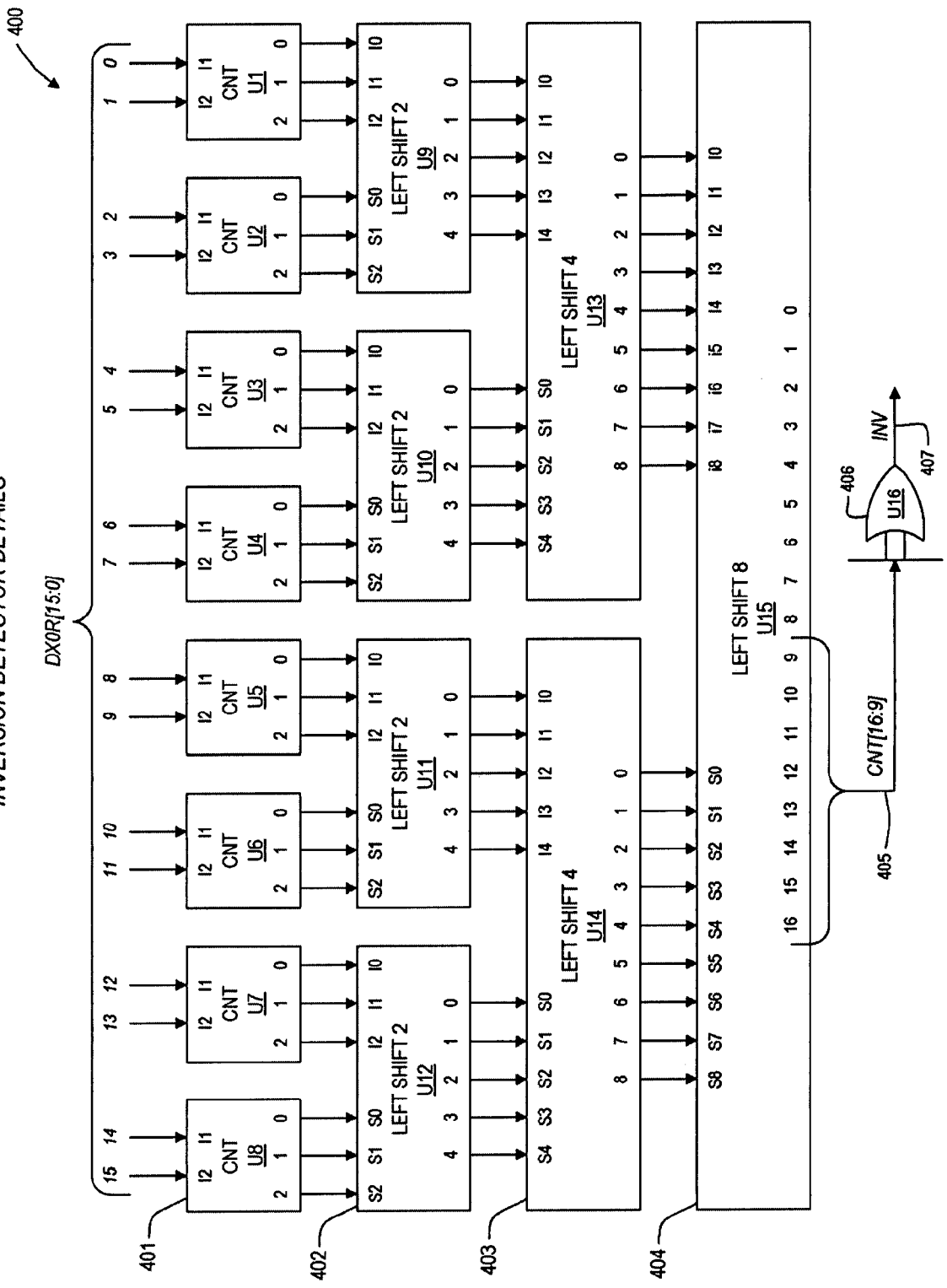
FIG. 4 is a block diagram showing details of an improved inversion detector according to the present invention, such as may be employed in the microprocessor of FIG. 3.

Now turning to FIG. 4, a block diagram is presented showing details of an improved inversion detector 400 according to the present invention, such as may be employed in the microprocessor of FIG. 3. The inversion detector 400 performs a counting function of the bits that are to change for a given signal group on the external data bus 307 during a following bus cycle. The changed bits are determined via a bitwise exclusive-OR operation, as discussed above, and are indicated by respective states of bits DXOR[15:0] on an exclusive-OR bus 309. In one embodiment, a logical one state indicates that a corresponding bit is to change state during the following bus cycle. In contrast to a conventional bus state sense mechanism 200, such as is discussed with reference to FIG. 2, the inversion detector 400 according to the present invention counts the number of changed bits (i.e., the number of bits in DXOR[15:0] which are asserted) by replacing the adders 209-211 with a combination of simple logic operations and logical shift operations, both of which are easily implemented in dynamic logic. As will be discussed below, the elements that perform these simple logic and logical shift operations require only the true states of DXOR[15:0], and do not require complementary states of DXOR[15:0] for stages following a first counting stage, thus eliminating any delay that might otherwise be incurred to invert the true state of any of the bits of DXOR[15:0].

The inversion detector 400 includes, in one embodiment, eight parallel count circuits 401, designated U8-U1, that each evaluate two bits of the 16-bit exclusive-OR bus DXOR[15:0]. Signal DXOR[0] is coupled to input I1 of U1 and DXOR[1] is coupled to input I2 of U1. Likewise, the remaining 14 signals DXOR[15:2] are coupled to inputs I1 and I2 of count circuits U8-U2 as shown in the block diagram. Each of the count circuits 401 performs a logical NOR operation, a logical XOR operation, and a logical AND operation, of the states of their two inputs I1, I2, in parallel. The NOR result is presented on output 0, the XOR result is provided on output 1, and the result of the AND operation is provided on output 2. Hence, if neither of the two inputs is set to logic one, then output 0 is set to logical one. If only one of the inputs I1, I2 is a logical one, then output 1 is set to a logical one state. If both inputs I1, I2 are logical ones, then output 2 is set to a logical one state. Consequently, the numbered output that is set to a logical one state indicates the number of inputs I1, I2 which are a logical one state.

It is noted that the logical XOR operation that is performed by each of the count circuits 401 does require that the complementary states of its inputs I1, I2 be generated. However, the count circuits 401 are the only elements of the inversion detector 400 that require inversion of inputs.

The outputs 2-0 of the count circuits 401 are routed to four left shift 2 circuits 402, designated U12-U9, each having data inputs I[2:0] and shift inputs S[2:0]. Outputs 2:0 of U1 are coupled to data inputs I[2:0] of U9 and outputs 2:0 of U2 are coupled to shift inputs S[2:0] of U9. Likewise, as shown in the block diagram, respective outputs 2:0 of count circuits U8-U6 are coupled as shown to the data inputs I[2:0] and shift inputs S[2:0] of left shift 2 circuits U12-U10.

The shift inputs S[2:0] direct the left shift 2 circuit 402 to perform a logical shift left of the bits coupled to the data inputs [2:0]. Recall that only one of the signals coupled each set of inputs I[2:0], S[2:0] is set to a logical one state, as a result of being coupled to the outputs 2-0 of the count circuits 401. Consequently, if S[0] is a logical one, then the inputs I[2:0] are not shifted. The inputs I[2:0] are shifted left by one bit if S[1] is set to a logical one, and the inputs I[2:0] are shifted left by two bits if S[2] is set to a logical one. Fill bits for the left shift operations are logical zeros. The result of the left shift 2 operation is presented, along with fill bits, on outputs 4:0 of U12-U9. Accordingly, the outputs 4:0 have at most one bit that is set to a logical one state, and the position of the "one" bit indicates the number of changed bits in the group of four bits from DXOR[15:0] that are associated with the respective left shift 2 circuit. As one skilled in the art will appreciate, a left shift circuit 402 is relatively simple to implement using dynamic logic and does not require generation of the complementary state for any input.

The outputs 4:0 of the four left shift 4 circuits 402 are coupled, as shown in the block diagram, to two left shift 4 circuits 403, designated U14-U13. Data inputs I[4:0] and shift inputs S[4:0] for each of the left shift 4 circuits 403 produce outputs 8:0 in substantially the same manner as discussed above with respect to operation of the left shift 2 circuit 402, the difference being in number of bits that are input, shifted, and output. Hence, the position of a bit set to a logical one state in the outputs 8:0 of the left shift 4 circuit 403 indicates the number of changed bits in the group of eight bits from DXOR[15:0] that are associated with the respective circuit 403. Like the left shift 2 circuit 402, one skilled in the art will appreciate that the left shift 4 circuit 403 is also relatively simple to implement using dynamic logic.

The outputs 8:0 of the two left shift 4 circuits 403 are provided to a single left shift 8 circuit 404 as shown in the block diagram. Data inputs I[8:0] and shift inputs S[8:0] for the left shift 8 circuit 404 produce outputs 16:0 in substantially the same manner as discussed above with respect to operation of the left shift 4 circuit 403, the difference being in number of bits that are input, shifted, and output. Hence, the position of a bit set to a logical one state in the outputs 16:0 of the left shift 8 circuit 404 indicates the number of changed bits in the entire signal group DXOR[15:0]. Likewise the left shift 8 circuit 404 is relatively simple to implement using dynamic logic.

To determine if more than a specified number of bits have changed, it is necessary only to perform a logical OR of those outputs of the left shift 8 circuit 404 from the bit positions associated with the change requirement. Based on the functions performed by circuits 401-403 in the preceding stages, only one of the output bits 16:0 will be set to a logical one state. For example, to determine if more than nine bits have changed, a logical OR should be performed of outputs 16:10. To determine if more than 8 bits have changed, as is shown in the block diagram, a logical OR is performed of outputs 16:9. Accordingly, outputs 16:9 are coupled to a count bus 405 having signals CNTR[16:9] disposed thereon. The count bus 405 is coupled to an 8-input OR gate 406, designated U16. The OR gate 406 generates an output 407, named INV. If output INV is asserted, then a data bus inversion is indicated for the respective signal group during the next bus cycle.

It is also noted that the use of dynamic logic design techniques allows for the OR function shown to be easily incorporated into the left shift 8 circuit 404, thus providing a single output INV, as opposed to outputs 16:0.

Accordingly, one advantage of the present invention over prior techniques is that all 16 bits of DXOR[15:0] are evaluated for change, instead of the 15 bits that are evaluated as discussed above with reference to a conventional bus state sense mechanism. Another advantage of the embodiment of FIG. 4 is XOR operations are only required for the count circuits 401, and the left shift circuits 402-404 utilize only the true states of their respective inputs, thus reducing the delay associated with the counting operation for purposes of data bus inversion.

The inversion detector 400 of FIG. 4 maintains an exact count, at each stage, of the bits that have changed for a respective grouping of signals from DXOR[15:0]. But the output 407 of the OR gate 406 indicates a relative count, or range, of the number of bits of DXOR[15:0] which are set to a logical one state. In the example of FIG. 4, a count greater than 8 bits is indicated by signal INV, meaning that the number of changed bits is between 9 bit and 16 bits. Thus, a simplification that can be made to the embodiment shown in FIG. 4 is to generate relative counts at each stage of the counting process as opposed to just at a final stage. Accordingly, FIG. 5 presents an alternative embodiment that eliminates the need for an XOR function in a first stage, which is found in the count circuits 401 of FIG. 4.

Figure 5:
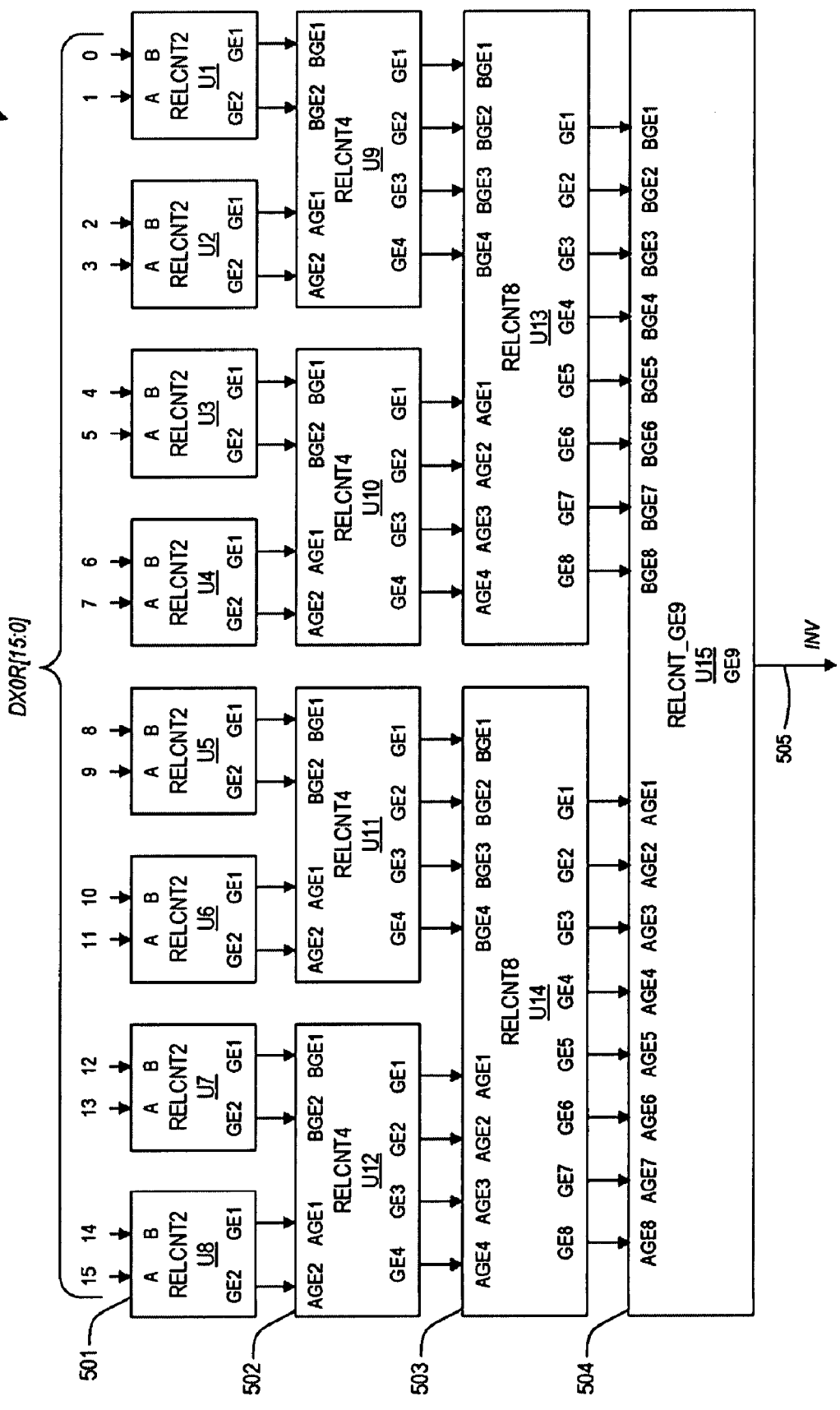
FIG. 5 is a block diagram illustrating an alternative embodiment of an inversion detector according to the present invention.

Referring to FIG. 5, details of an alternative inversion detector 500 are presented, such as may be employed in the microprocessor of FIG. 3. The alternative inversion detector 500 includes, in one embodiment, eight parallel relative count 2 circuits 501, designated U8-U1, that each evaluate two bits of the 16-bit exclusive-OR bus DXOR[15:0]. Signal DXOR [0] is coupled to input B of U1 and DXOR[1] is coupled to input A of U1. Likewise, the remaining 14 signals DXOR[15: 2] are coupled to inputs B and A of relative count 2 circuits U8-U2 as shown in the block diagram.

In operation, each of the relative count 2 circuits 501 is configured to perform a logical OR operation and a logical AND operation of the states of their two inputs A, B, in parallel. A result of the logical OR operation is provided on output GE1 and a result of the logical AND operation is generated on output GE2. Thus, if GE1 set to a logical one, this indicates that the number of changed bits is greater than or equal to 1. GE2 set to a logical one indicates the number of changed bits is equal to 2. It is noted that the relative count 2 circuits 501, since they only perform logical OR and logical AND operations, utilize only the true states of their respective inputs B, A. It is not necessary to generate complementary states, and thus, the alternative embodiment 500 provides improved performance over the embodiment 400 of FIG. 4.

The outputs GE[2:1] of the relative count 2 circuits 501 are routed to four relative count 4 circuits 502, designated U12-U9, each having AGE inputs AGE[2:1] and BGE inputs BGE [2:1]. Outputs GE[2:1] of U1 are coupled to BGE inputs BGE[2:1] of U9 and outputs GE[2:1] of U2 are coupled to AGE inputs AGE[2:1] of U9. Likewise, as shown in the block diagram, respective outputs GE[2:1] of relative count circuits U8-U6 are coupled as shown to the BGE inputs BGE[2:1] and AGE inputs AGE[2:1] of relative count 4 circuits U12-U10.

In operation, each of the relative count 4 circuits 502 is configured to perform a series of simple logical operations, including only logical AND operations and/or logical OR operations, of the states of their four inputs AGE[2:1], BGE [2:1], in parallel. The relative count 4 circuit 502 generates four result outputs GE[4:1] indicating the number of changed bits for their respective signal subgroup is greater than or equal to 4, 3, 2 and 1, respectively. In other words, a value of 0111b on GE[4:1] indicates that the number of changed bits is greater than or equal to three. The logic functions are provided below for each of the outputs GE[4:1], where "·" indicates a logical AND operation and where a "+" indicates a logical OR operation.

$GE4 = AGE2 \cdot BGE2$ $GE3 = (AGE2 \cdot BGE1) + (AGE1 \cdot BGE2)$ $GE2 = AGE2 + (AGE1 \cdot BGE1) + BGE2$ $GE1 = AGE1 + BGE1$ The outputs GE[4:1] of the relative count 4 circuits 502 are routed to two relative count 8 circuits 503, designated U14-U13, each having AGE inputs AGE[4:1] and BGE inputs BGE[4:1]. Outputs GE[4:1] of U9 are coupled to BGE inputs BGE[4:1] of U13 and outputs GE[4:1] of U10 are coupled to AGE inputs AGE[4:1] of U13. Likewise, as shown in the block diagram, respective outputs GE[4:1] of relative count 4 circuits U12-U11 are coupled as shown to the BGE inputs BGE[4:1] and AGE inputs AGE[4:1] of relative count 8 circuit U14.

In operation, each of the relative count 8 circuits 503 is configured to perform a series of simple logical operations, including only logical AND operations and/or logical OR operations, of the states of their eight inputs AGE[4:1], BGE [4:1], in parallel. The relative count 8 circuit 503 generates eight result outputs GE[8:1] indicating that the number of changed bits for their respective signal subgroup is greater than or equal to 8, 7, 6, 5, 4, 3, 2 and 1, respectively. In other words, a value of 00111111b on GE[8:1] indicates that the number of changed bits is greater than or equal to six. The logic functions are provided below for each of the outputs GE[8:1].

$GE8 = AGE4 \cdot BGE4$ $GE7 = (AGE4 \cdot BGE3) + (AGE3 \cdot BGE4)$ $GE6 = (AGE4 \cdot BGE2) + (AGE3 \cdot BGE3) + (AGE2 \cdot BGE4)$ $GE5 = (AGE4 \cdot BGE1) + (AGE3 \cdot BGE2) + (AGE2 \cdot BGE3) + (AGE1 \cdot BGE4)$ $GE4 = AGE4 + (AGE3 \cdot BGE1) + (AGE2 \cdot BGE2) + (AGE1 \cdot BGE3) + BGE4$ $$GE3=AGE3+(AGE2 \cdot BGE1)+(AGE1 \cdot BGE2)+BGE3$$

$$GE2=AGE2+(AGE1 \cdot BGE1)+BGE2$$

$$GE1=AGE1+BGE1$$

The outputs of the third stage of relative count circuits are routed to a final relative count circuit 504 designated U15, having AGE inputs AGE[8:1] and BGE inputs BGE[8:1]. Outputs GE[8:1] of U13 are coupled to BGE inputs BGE[8:1] of U15 and outputs GE[8:1] of U14 are coupled to AGE inputs AGE[8:1] of U15. Count circuit 504 generates a single output, INV, on bus 505 indicating that the number of changed bits is greater than or equal to 9. The logic function that is employed to generate output INV employs only simple logical AND and logical OR operations, and is described below.

$$INV=(AGE8 \cdot BGE1)+(AGE7 \cdot BGE2)+(AGE6 \cdot BGE3)+\\(AGE5 \cdot BGE4)+(AGE4 \cdot BGE5)+(AGE3 \cdot BGE6)+\\(AGE2 \cdot BGE7)+(AGE1 \cdot BGE8)$$

Output INV is provided to a bus inverter, such as the bus inverter 311 shown in FIG. 3. If INV is asserted, then the bus inverter is directed to invert the states of the respective signal group for presentation on an external data bus during a following bus cycle.

Although the present invention and its objects, features, and advantages have been described in detail, other embodiments are encompassed by the invention as well. For example, although the inversion detector 500 of FIG. 5 is described for a 16-bit signal group, the present inventor notes that other structures that maintain relative counts through logic levels are possible and, depending on the number of changed bits to be considered, may be advantageous. For example, the first stage of relative count circuits 501 may consider three instead of two bits. Thus, a three-bit relative count circuit would generate three outputs GE[3:1], and would operationally implement the following simple logic functions.

$$GE3=A \cdot B \cdot C$$

$$GE2=(A \cdot B)+(A \cdot C)+(B \cdot C)$$

$$GE1=A+B+C$$

In addition, although the present invention has been characterized in terms of a inversion detection system for a microprocessor, it is noted that other types of applications are comprehended to include any type of bit counter that employs domino logic design elements.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A bus inversion apparatus, comprising:
   a plurality of exclusive-OR gates, coupled to an instant data bus and a last data bus, said data buses having a corresponding plurality of bits, wherein said plurality of exclusive-OR gates is configured to perform a bitwise comparison of said data buses, and to provide an exclusive-OR bus, wherein the states of bits of said exclusive-OR bus indicate whether corresponding bits of said data buses are different; and
   an inversion detector; coupled to said exclusive-OR bus, configured to count the number of said corresponding bits that are different, and configured to indicate that said instant data bus should be inverted, wherein said inversion detector comprises:
   a plurality of left shift circuits, each configured to perform a logical left shift of input bits as directed by the states of shift bits, wherein outputs of said each of said plurality of left shift circuits indicate a number of a subgroup of said corresponding bits that are different.

2. The bus inversion apparatus as recited in claim 1, further comprising:
   a bus inverter, coupled to said inversion detector, configured to invert said instant data bus.

3. The bus inversion apparatus as recited in claim 1, wherein said corresponding plurality of bits of said data buses comprises 16 bits.

4. The bus inversion apparatus as recited in claim 1, wherein said inversion detector further comprises an OR gate, coupled to a final left shift circuit that indicates the number of said corresponding bits that are different, wherein a logical OR of selected outputs of said final left shift circuit is performed to generate an invert signal directing that said instant data bus be inverted.

5. The bus inversion apparatus as recited in claim 1, wherein said inversion detector comprises a plurality of count circuits as a first stage, said count circuits being coupled, respectively, to different bit sets of said exclusive-OR bus, and wherein each of said count circuits indicates a number of bits in said different bit sets that are different.

6. The bus inversion apparatus as recited in claim 1, wherein said plurality of left shift circuits comprises one or more left shift 2 circuits, one or more left shift 4 circuits, and one or more left shift 8 circuits.

7. The bus inversion apparatus as recited in claim 1, wherein said inversion detector is disposed within a microprocessor.

8. A bus inversion mechanism, comprising:
   a plurality of exclusive-OR gates, coupled to an instant data bus and a last data bus, said data buses having a corresponding plurality of bits, wherein said plurality of exclusive-OR gates is configured to perform a bitwise comparison of said data buses, and to provide an exclusive-OR bus, wherein the states of bits of said exclusive-OR bus indicate whether corresponding bits of said data buses are different; and
   an inversion detector; coupled to said exclusive-OR bus, configured to count the number of said corresponding bits that are different, and configured to indicate that said instant data bus should be inverted, wherein said inversion detector comprises:
   a plurality of relative count circuits, each configured to perform logical operations on the true states of input bits, said true states being exclusively operated upon, wherein outputs of said each of said plurality of relative count circuits indicate a range of a subgroup of said corresponding bits that are different, wherein said plurality of relative count circuits comprises one or more relative count 2 circuits, one or more relative count 4 circuits, and one or more relative count 8 circuits.

9. The bus inversion mechanism as recited in claim 8, further comprising:
   a bus inverter, coupled to said inversion detector, configured to invert said instant data bus.

10. The bus inversion mechanism as recited in claim 8, wherein said corresponding plurality of bits of said data buses comprises 16 bits.

11. The bus inversion mechanism as recited in claim 8, wherein said inversion detector further comprises a final relative count circuit that determines the number of said corresponding bits that are different, and wherein said final relative count circuit generates an invert signal directing that said instant data bus be inverted if the number of said corresponding bits that are different is greater than a predetermined number of bits.

12. The bus inversion mechanism as recited in claim 11, wherein said predetermined number is 8 bits.

13. The bus inversion mechanism as recited in claim 8, wherein said inversion detector is disposed within a microprocessor.

14. A method for performing bus inversion, comprising:
first performing a bitwise exclusive-OR of an instant data bus and a last data bus, the data buses having a plurality of bits, and providing an exclusive-OR bus, wherein the states of bits of the exclusive-OR bus indicate whether corresponding bits the data buses are different; and
counting the number of the corresponding bits that are different, and indicating that the instant data bus should be inverted, wherein said counting comprises:
second performing logical operations on the true states of the bits in the exclusive-OR bus, wherein the true states are exclusively operated upon, and indicating a range of a subgroup of the corresponding bits that are different; and
first generating one or more relative counts of two of the corresponding bits, second generating one or more relative counts of four of the corresponding bits, and third generating one or more relative counts of eight of the corresponding bits, and fourth generating one or more relative counts of all of the corresponding bits.

15. The method as recited in claim 14, further comprising: inverting the instant data bus.

16. The method as recited in claim 14, wherein the corresponding plurality of bits of the data buses comprises 16 bits.

17. The method as recited in claim 14, wherein counting further comprises generating a final relative count that indicates the number of said corresponding bits that are different, and generating an invert signal directing that said instant data bus be inverted if the number of the corresponding bits that are different is greater than a predetermined number of bits.

18. The method as recited in claim 17, wherein the predetermined number is 8 bits.

19. The method as recited in claim 14, wherein said first performing and said counting are accomplished within a microprocessor.

* * * * *